(12) United States Patent
Kumar et al.

(10) Patent No.: US 12,541,991 B2
(45) Date of Patent: Feb. 3, 2026

(54) AUTOMATICALLY CLASSIFYING HETEROGENOUS DOCUMENTS USING MACHINE LEARNING TECHNIQUES

(71) Applicant: International Business Machines Corporation, Armonk, NY (US)

(72) Inventors: Atul Kumar, Bangalore (IN); Sahil Bansal, Delhi (IN); Ruchi Mahindru, Yorktown Heights, NY (US); Seema Nagar, Bangalore (IN); Daniela Rosu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1093 days.

(21) Appl. No.: 17/215,641

(22) Filed: Mar. 29, 2021

(65) Prior Publication Data
US 2022/0309276 A1     Sep. 29, 2022

(51) Int. Cl.
*G06V 30/416*  (2022.01)
*G06F 18/2431*  (2023.01)
*G06N 20/00*  (2019.01)

(52) U.S. Cl.
CPC ........ *G06V 30/416* (2022.01); *G06F 18/2431* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 6,542,635 B1 * | 4/2003 | Hu | G06V 30/414 |
| | | | 382/175 |
| 9,235,758 B1 * | 1/2016 | Agrawal | G06T 7/11 |
| 10,565,502 B2 * | 2/2020 | Scholtes | G06F 16/00 |
| 2018/0365322 A1 * | 12/2018 | Hou | G06N 20/10 |
| 2019/0065991 A1 * | 2/2019 | Guggilla | G06N 3/0442 |

(Continued)

FOREIGN PATENT DOCUMENTS

WO    2020136778    7/2020

OTHER PUBLICATIONS

Hui Wang et al. (https://ieeexplore.ieee.org/stamp/stamp.jsp?tp=&arnumber=9197624), hereinafter Wang, Sep. 29, 2020, 15 pages (Year: 2020).*

(Continued)

*Primary Examiner* — Haimei Jiang
(74) *Attorney, Agent, or Firm* — Ryan, Mason & Lewis, LLP (57) ABSTRACT

Methods, systems, and computer program products for automatically classifying heterogeneous documents using machine learning techniques are provided herein. A computer-implemented method includes extracting multiple features from one or more sets of heterogeneous documents; arranging at least a portion of the extracted features into multiple hierarchically-defined classes; selecting one or more of the documents associated with each of the multiple hierarchically-defined classes; training at least one machine learning model using at least a portion of the selected documents; and automatically classifying at least one input document into one or more of the multiple hierarchically-defined classes by processing one or more portions of the at least one input document using the at least one trained machine learning model.

20 Claims, 7 Drawing Sheets

(56) References Cited

U.S. PATENT DOCUMENTS

| | | | | |
|---|---|---|---|---|
| 2021/0090694 A1* | 3/2021 | Colley | ................... | G16B 30/00 |
| 2021/0271805 A1* | 9/2021 | Comeau | ................. | G06N 20/00 |
| 2021/0272040 A1* | 9/2021 | Johnson | ................. | G10L 25/24 |
| 2021/0374455 A1* | 12/2021 | Ghosh | ................... | G06F 16/953 |
| 2022/0129688 A1* | 4/2022 | Yu | ........................ | G06V 10/457 |

OTHER PUBLICATIONS

Mell et al., The NSIT Definition of Cloud Computing, Special Publication 800-145, Sep. 2011.

Burstrom, J., A Multimodal Approach to Autonomous Document Categorization Using Convolutional Neural Networks, Feb. 12, 2019.

Kolsch et al., Real-Time Document Image Classification using Deep CNN and Extreme Learning Machines, Nov. 15, 2017.

Vidhya et al., Feature Extraction for Document Classification, May 2015.

Popat et al., Hierarchical document clustering based on cosine similarity measure, Apr. 1, 2019.

Awal et al., Complex Document Classification and Localization Application on Identity Document Images, 14th IAPR International Conference on Document Analysis and Recognition (ICDAR), 2017.

Kumar et al., Unsupervised Classification of Structurally Similar Document Images, 12th International Conference on Document Analysis and Recognition, 2013.

Audebert et al., Multimodal Deep Networks for Text and Image-Based Document Classification, Jul. 15, 2019.

Chen et al., Meta-Classifiers for Multimodal Document Classification, IEEE International Workshop on Multimedia Signal Processing, Dec. 1, 2009.

Diligenti et al., Hidden Tree Markov Models for Document Image Classification, IEEE Transactions on Pattern Analysis and Machine Intelligence, 2003.

Bagdanov et al., Fine-grained Document Genre Classification Using First Order Random Graphs, Proceedings of Sixth International Conference on Document Analysis and Recognition, 2001.

Shin et al., Document Image Retrieval Based on Layout Structural Similarity, Proceedings of the 2006 International Conference on Image Processing, Computer Vision, & Pattern Recognition.

Hu et al., Document Image Layout Comparison and Classification, Jun. 2000.

Starr et al., Corpus Conversion Service: A Machine Learning Platform to Ingest Documents at Scale, KDD 2018.

Eglin et al., Document page similarity based on layout visual saliency: application to query by example and document classification, ICDAR, 2003.

Yang et al., Learning to Extract Semantic Structure from Documents Using Multimodal Fully Convolutional Neural Networks, CVPR 2017.

Kachouri et al., Feature extraction and relevance evaluation for heterogeneous image database recognition, Nov. 26, 2008.

* cited by examiner

AUTOMATICALLY CLASSIFYING HETEROGENOUS DOCUMENTS USING MACHINE LEARNING TECHNIQUES

BACKGROUND

The present application generally relates to information technology and, more particularly, to data processing techniques. More specifically, in multiple domains (e.g., support, compliance, software engineering, etc.), determination content often resides in large documents. Such documents typically contain heterogeneous types of content represented, for example, in tables, images, paragraphs, etc. Automatic extraction and understanding of such documents is required for performing targeted snippet extraction that can be used, for example, in contexts such as question and answer scenarios, search scenarios, etc. Conventional document processing and information extraction applications occasionally use machine learning-based systems, wherein such systems have multiple pre-trained models to process different types of documents (because, via such conventional approaches, no single model provides capability to process all types of documents in optimal ways). Accordingly, conventional document processing and information extraction applications require manual selection of a model for each new document to be processed, creating a bottleneck in scaling a document processing and/or ingestion pipeline.

SUMMARY

In one embodiment of the present invention, methods for automatically classifying heterogeneous documents using machine learning techniques are provided. An exemplary computer-implemented method can include extracting multiple features from one or more sets of heterogeneous documents, arranging at least a portion of the extracted features into multiple hierarchically-defined classes, and selecting one or more of the documents associated with each of the multiple hierarchically-defined classes. The method can also include training at least one machine learning model using at least a portion of the selected documents, and automatically classifying at least one input document into one or more of the multiple hierarchically-defined classes by processing one or more portions of the at least one input document using the at least one trained machine learning model.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes automatically classifying heterogeneous domain-specific documents using machine learning techniques. Such an embodiment can also include automatically selecting at least one pre-trained model (e.g., at least one machine learning model from among a set of one or more available machine learning models for that domain and/or user) for processing and/or ingesting at least one document (e.g., at least one new document).

As further detailed herein, one or more embodiments include arranging documents in one or more hierarchical classes using one or more features extracted from at least one user-created document collection. Additionally or alternatively, human feedback (if available) can be used to learn and/or correct one or more levels of hierarchy across the one or more classes. Such an embodiment also includes automatically determining at least one level of granularity required for processing based at least in part on the one or more extracted features and the number of collections created by the user(s).

Also, one or more embodiments include selecting a subset of documents from the at least one user-created collection based, for example, at least in part on the extracted features, and using such documents to train one or more machine learning models for processing the entire collection(s). Such models can be trained, for example, using human-annotated documents, wherein a human (e.g., a subject matter expert) marks different parts of the document and informs the system whether each annotated portion pertains, e.g., to a heading, a sub-heading, a table cell, an image, a caption, normal text, an itemized list, etc. The one or more machine learning models learn from these annotations and develop an ability to process similar documents without any need for human annotations.

In processing at least a portion of the collection(s) with the one or more trained machine learning models, at least one embodiment includes automatically creating document sets from the collection(s), for example, by determining and/or suggesting that one or more individual documents belong to an existing portion of the collection(s), that incremental training is required for processing the document with the collection(s), or that a new collection should be created for the document (as the document, for example, does not fit well in any portion of the existing collection(s)).

Accordingly, given a number of document sets, at least one embodiment includes automatically extracting a bag of features for each set, and creating a classification hierarchy using the extracted features and one or more user-defined classes. Additionally or alternatively, one or more embodiments can include generating a classifier using a K-means classifier, wherein K represents the number of models available. Further, the generated classification hierarchy and/or the generated classifier is used to process one or more documents and classify each such document to the most appropriate set, which can include an existing set or a newly-created set (as detailed herein).

Such an embodiment includes determining if a given document belongs to an existing document set but requires additional training (e.g., annotation) for improved processing. In an example of such an embodiment, when significant text and/or artifacts (e.g., more than a predefined threshold amount of text and/or artifacts) cannot be categorized to any of the features in a model, while a significant portion of the document can be categorized by the model, then the system can decide to annotate the document to train the model for the unrecognized part(s). Additionally or alternatively, such an embodiment can include determining if a given document does not fit and/or belong to any existing set of documents, and if so, whether a new set (and training) needs to be created by annotating the given document.

For a new document corpus, for which no training or partitioning is available, one or more embodiments include using one or more existing feature sets (learnt over time from other document sets) to recommend a number of different sets of documents needed for the corpus to create annotations (e.g., trainings). For example, for a new corpus, like any corpus, sets of documents need to be defined so that different machine learning models can be trained for each set to process that set in an optimal way. Such an embodiment also includes recommending one or more existing models that can be used as base models for training (e.g., to minimize training efforts). Further, at least one embodiment can include automatically selecting a subset of documents from a document set that represents the entire set (e.g., for the purpose of training).

Accordingly, at least one embodiment includes automatically extracting features from a number of document collections (also referred to herein as document sets) and arranging such features to create a classification hierarchy. Such an embodiment includes automatically detecting the granularity of classification required for one or more given documents (e.g., determining a level of granularity that is enough to cover available document collections). In such an embodiment, features for all levels need not be extracted in all cases (e.g., if the features and/or levels are not needed to further differentiate documents), and human feedback (if available) can be utilized to learn and/or correct one or more levels of hierarchy.

Additionally, one or more embodiments include selecting a subset of documents from a collection that represents the entire collection, feature-wise. This subset can be used for annotation and/or training, resulting in at least one model (e.g., the best model) for the collection. Also, for a new document corpus, wherein no collections and/or sets are defined, at least one embodiment includes extracting features from the documents, comparing such features with various existing and/or historical classification hierarchies, and recommending, based at least in part on the comparison, a number (e.g., an optimal number) of classes and/or collections to create training models for the corpus.

Figure 1:
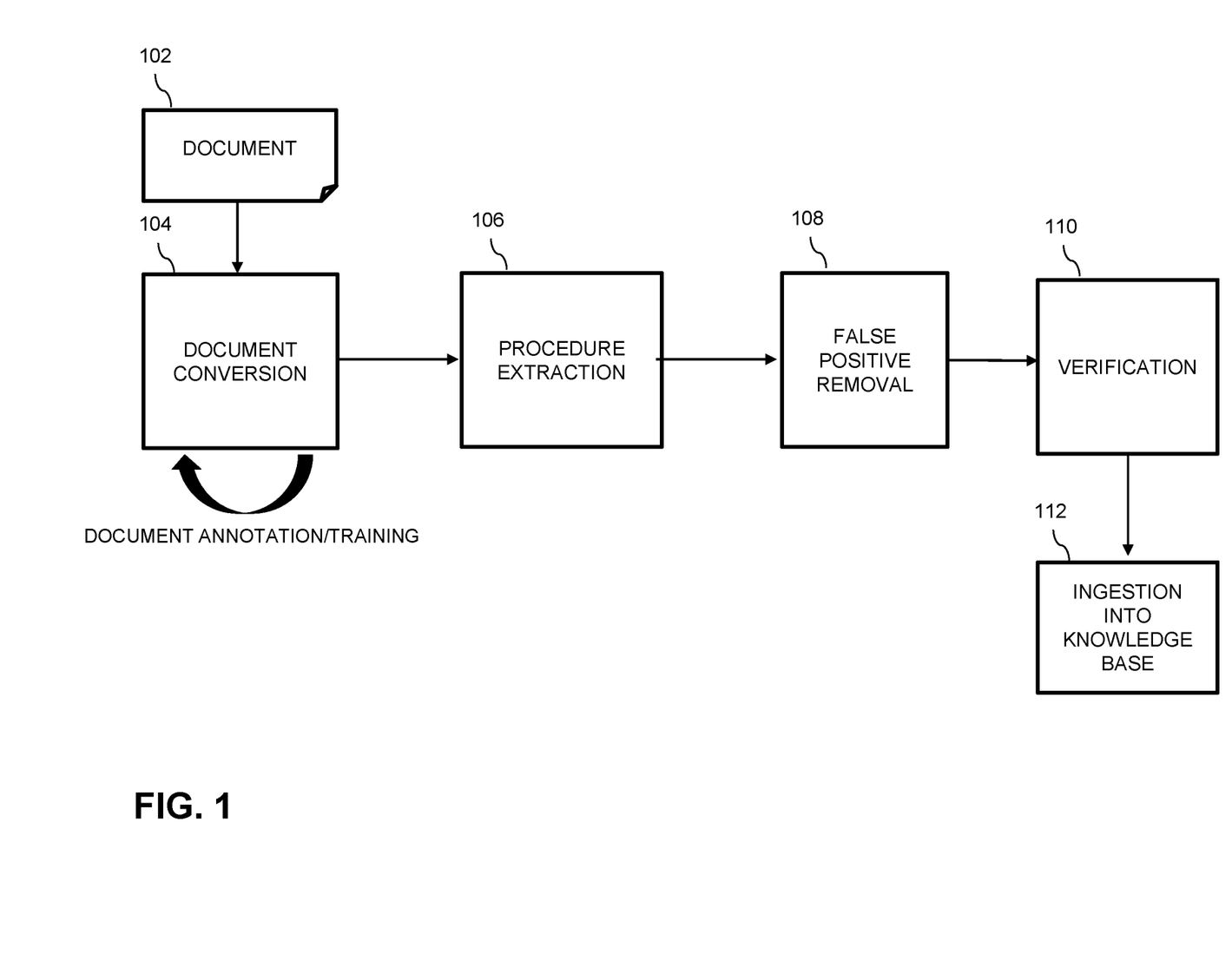
FIG. 1 is a diagram illustrating system architecture, according to an exemplary embodiment of the invention.

FIG. 1 is a diagram illustrating system architecture, according to an embodiment of the invention. By way of illustration, FIG. 1 depicts document 102, which is converted via document conversion component 104 (which carries out document training and/or annotation). Additionally, subsequent to the actions performed by document conversion component 104, procedure extraction steps are performed in step 106 and false positives are removed in step 108. The remaining data are verified in step 110 and output to and/or ingested into at least one knowledge base 112.

In connection with an example use case consistent with an embodiment such as illustrated in FIG. 1, technical troubleshooting content is commonly available in the form of portable document format (PDF) documents. These documents typically offer solutions and diagnostic information as procedures (i.e., with a set of steps, sub-procedures, etc.) and free text. As such, content extraction is required, for example, to perform targeted question answering, and to use the procedures in a step-by-step help and/or automation method.

By way of specific example, document structure and text, from document 102, can be extracted using document conversion component 104 (e.g., a smart document understanding (SDU) corpus conversion service (CCS)) with annotation-based training (e.g., the document contents and structure can be represented as JSON). It is to be appreciated that, in one or more embodiments, many models can be created and/or utilized for different types of documents. For example, L2L models can extract paragraphs, sections, and/or procedures from the annotated documents (wherein, e.g., the L2L procedure is in JSON format). By way of further illustration and example, L2L comprises a research service that can extract document chunks from a document so that each chunk can then be used as a unit (for example, for indexing in a search engine). L2L can also extract procedures present in a document by automatically identifying procedure boundaries as well as individual steps and conditions, if any. Accordingly, when a new document is seen, one of the pre-trained models is selected for converting that document.

As noted above, one or more embodiments can include performing document conversion using CCS/SDU, wherein CCS/SDU extracts one or more custom fields from the document using a machine learning-based system that allows training using annotation. By way of example, a user can annotate different parts and/or fields of a document using a browser-based visual tool, and a system can automatically identify similar parts and/or fields in the rest of the pages and/or document. Accordingly, one or more embodiments include generating and/or training at least one machine learning model for extracting fields for a collection of similar documents.

Referring again to using CCS, such an embodiment can include, for example, using a PDF parser to extract cells from the PDF document(s). CCS models can include, for example, at least one object (e.g., tables, images, text, etc.) detection model (e.g., YOLOv2), at least one machine learning-based random forest model, etc. Features utilized in such an embodiment can include, for example, page number, size of text cell, position, distance from the neighboring cells, text style (normal, italic, or bold), size, etc.

Figure 2:
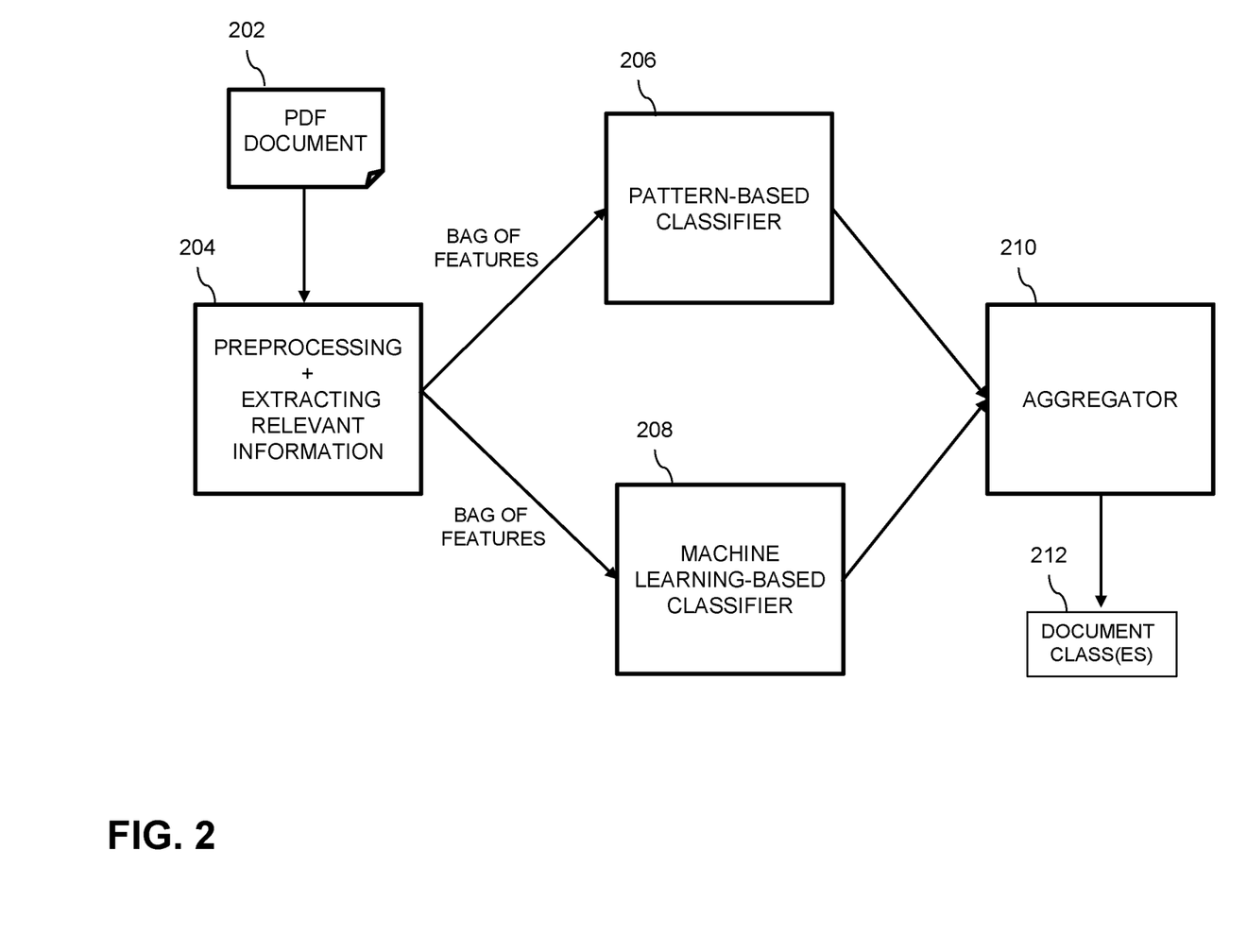
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts PDF document 202, which is preprocessed by component 204 (which includes extraction of relevant information, as further detailed herein). Preprocessing component 204 generates at least one bag of features, which is provided as input to pattern-based classifier 206 and machine learning-based classifier 208. In one or more embodiments, the pattern-based classifier 206 arranges documents into hierarchically arranged clusters, while machine learning-based classifier 208 arranges documents into existing set of classes and generates and/or provides a confidence score attached with the classification. The hierarchically arranged set of documents can be used as ground truth (optionally with one or more minor modifications) to train the machine learning-based classifier 208.

Based at least in part on the outputs from pattern-based classifier 206 and machine learning-based classifier 208, aggregator 210 generates and outputs at least one document class 212 (e.g., a book with numbered chapters, a book without numbered chapters, an article with numbered sections, an article without numbered sections, generic text with images, generic text without images, etc.). Accordingly, the pattern-based classifier 206 and the machine learning-based classifier 208 independently classify a document. The aggregator 210, based at least in part on a pre-configured logic, can determine which result to use for which document class.

In connection with an example embodiment such as depicted in FIG. 2, preprocessing component 204 can include a parser (e.g., PDFMiner) which determines variables such as, for example, bounding box coordinates, font type, size, string text values at character and text-line levels, etc. Such a component can merge character-level and text-line level information to obtain and/or identify a text-block and page-level information, while also discarding blocks with given features (e.g., blocks with an area that is less than or equal to 0.1% of the page area).

Additionally, in such an embodiment, preprocessing component 204 can also extract candidate features. For example, font-size distribution can be used to identify heading versus non-heading text blocks, and pattern matching techniques can be used to identify text that is numbered, bulleted, or not numbered and/or bulleted, as well as to identify indices and/or contents pages. Also, heading levels and titles can be identified using font-size and positioning of a heading text block relative to the page, and headers and/or footers can be identified using the positioning of a text block relative to the page, as well as using frequency information. Further, image captions can be identified using the positioning of text blocks relative to images. In one or more embodiments, additional features can be identified and/or extracted, such as title repetitions, body text, table cells, etc.

By way merely of example, one or more sets of features used in conjunction with at least one embodiment can include font types, font-sizes, bounding box coordinates and/or indentation(s), entropy of one or more text blocks, and vertical compactness. With respect to entropy of one or more text blocks, at least one embodiment includes computing the number of transitions from background to text on one or more horizontal lines, estimating a transition probability occurrence on a pixel for each horizontal line, and maintaining the maximum probability, p, in a text block. Entropy, $E(t)$, is then defined for each block as $E(t)=-p*\log(1/p)+(1-p)*\log(1/(1-p))$, wherein, as used herein, entropy refers to the measure of complexity directly influenced by font style and text size. With respect to vertical compactness, at least one embodiment includes determining the ratio of the number of lines to the height of a text block.

As also depicted in the example embodiment of FIG. 2, preprocessing component 204 generates and outputs one or more bags of features for one or more items in the given document 202 for processing by pattern-based classifier 206 and machine learning-based classifier 208. Such a bag of features can include, for example, features such as title (in connection with formatting attributes), levels of headings (e.g., font type, font size, numbering scheme, indentation, etc.), body text (in connection with formatting attributes, multiple body text schemas, etc.), images (in connection with formatting attributes), captions (in connection with formatting attributes), headers (in connection with formatting attributes, indentation(s), etc.), footers (in connection with formatting attributes, indentation(s), etc.), title repetitions (in connection with formatting attributes), and the presence of one or more special sections (e.g., indices, contents, table of contents, references, etc.).

As also detailed herein, one or more embodiments include performing one or more different levels of clustering. By way of illustration, in such an embodiment, the granularity level at which classification needs to be carried out may depend on the needs of a given user. Such classifications may vary between, for example, intra-document type classification (for instance, for classifying articles versus books), inter-document type classification (for instance, for classifying one type of article versus another type of article), etc. Accordingly, at each level, different features can be targeted and/or utilized, and users can specify one or more metrics related to the classification(s). Additionally or alternatively, in at least one embodiment, after a machine learning-based classifier is in place and/or selected, multiple levels will no longer be needed, and such an embodiment can include performing the complete segregation at a single level, selecting and/or using one or more filters for the classification(s).

As noted, one or more embodiments can include using multiple levels of clustering documents. By way merely of illustration, consider the following example embodiment which includes three levels. In such an example embodiment, a first level is based on whether documents have similar kinds of objects. Differentiating features for this level can include headers, footers, and title repetitions.

Additionally, in such an embodiment, for each of the clustering levels, one or more basis vectors can be implemented to determine the appropriate cluster for placing a new document. For example, with respect to the first level, the number of clusters can be equal to the number of unique basis vectors. With respect to a document corpus, the number of clusters can be based, e.g., on the number of different kinds or types of articles. Further, with respect to a second level, the number of clusters can be based, for example, on whether the sections and/or headings of the documents are numbered. For instance, such a second level can comprise three clusters, wherein a first cluster includes documents having numbered sections and/or headings, a second cluster includes documents having unnumbered sections and/or headings, and a third cluster includes documents that do not have headings and/or sections, or headings and/or sections were not identified via the extraction logic.

Also, in such an example embodiment, a third level can be based on the ratio of font sizes across different sub-parts of the document such as title, headings, headers, footers, body text, etc. Such an embodiment can also, for example, consider variation of font sizes within sub-parts of documents. As noted above, for each of the clustering levels, one or more basis vectors can be implemented to determine the appropriate cluster for placing a new document. With respect to the above-noted example third level, the number of clusters can be equal to round(sqrt(#documents)), with a given maximum number of clusters being optionally determined and/or implemented. Also, for such a level, one or more basis vectors can include one or more cluster centers from k-means clustering.

Figure 3:
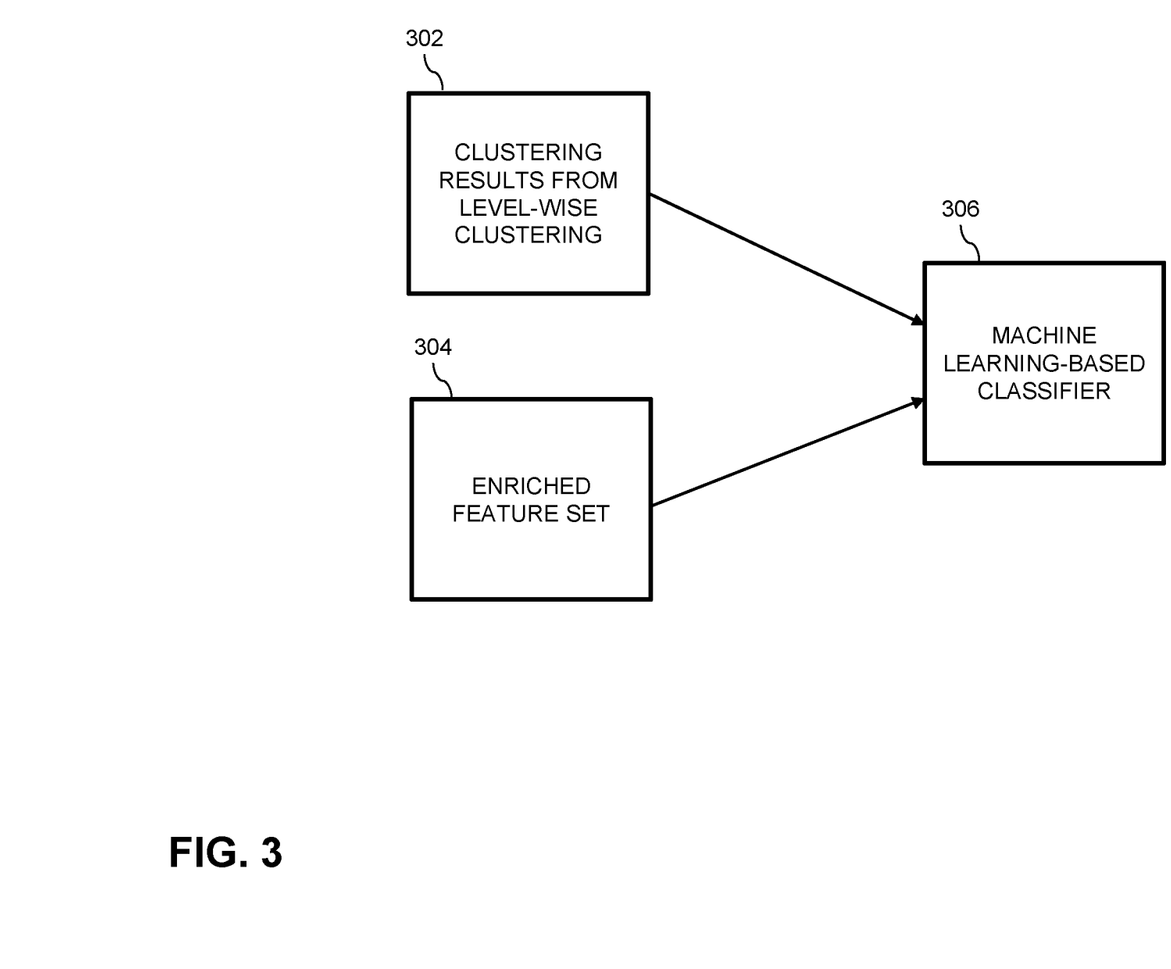
FIG. 3 is a diagram illustrating a machine learning-based classifier, according to an exemplary embodiment of the invention.

FIG. 3 is a diagram illustrating a machine learning-based classifier, according to an exemplary embodiment of the invention. By way of illustration, FIG. 3 depicts clustering results 302 from level-wise clustering (e.g., (x, y):(document, label)) and an enriched feature set 304, which are provided to machine learning-based classifier 306 (e.g., for training and/or implementing the classifier). In at least one embodiment, an enriched feature set 304 can be generated by using feature vectors computed for multiple levels of clustering in conjunction with features such as, for example, entropy, vertical compactness, headings-to-text ratio, etc. Machine learning-based classifier 306, in one or more embodiments, can include a random forest classifier and can encompass and/or utilize weights (W=$w_1$, $w_2$, $w_3$, . . . ) indicating the importance of each of the features.

Figure 4:
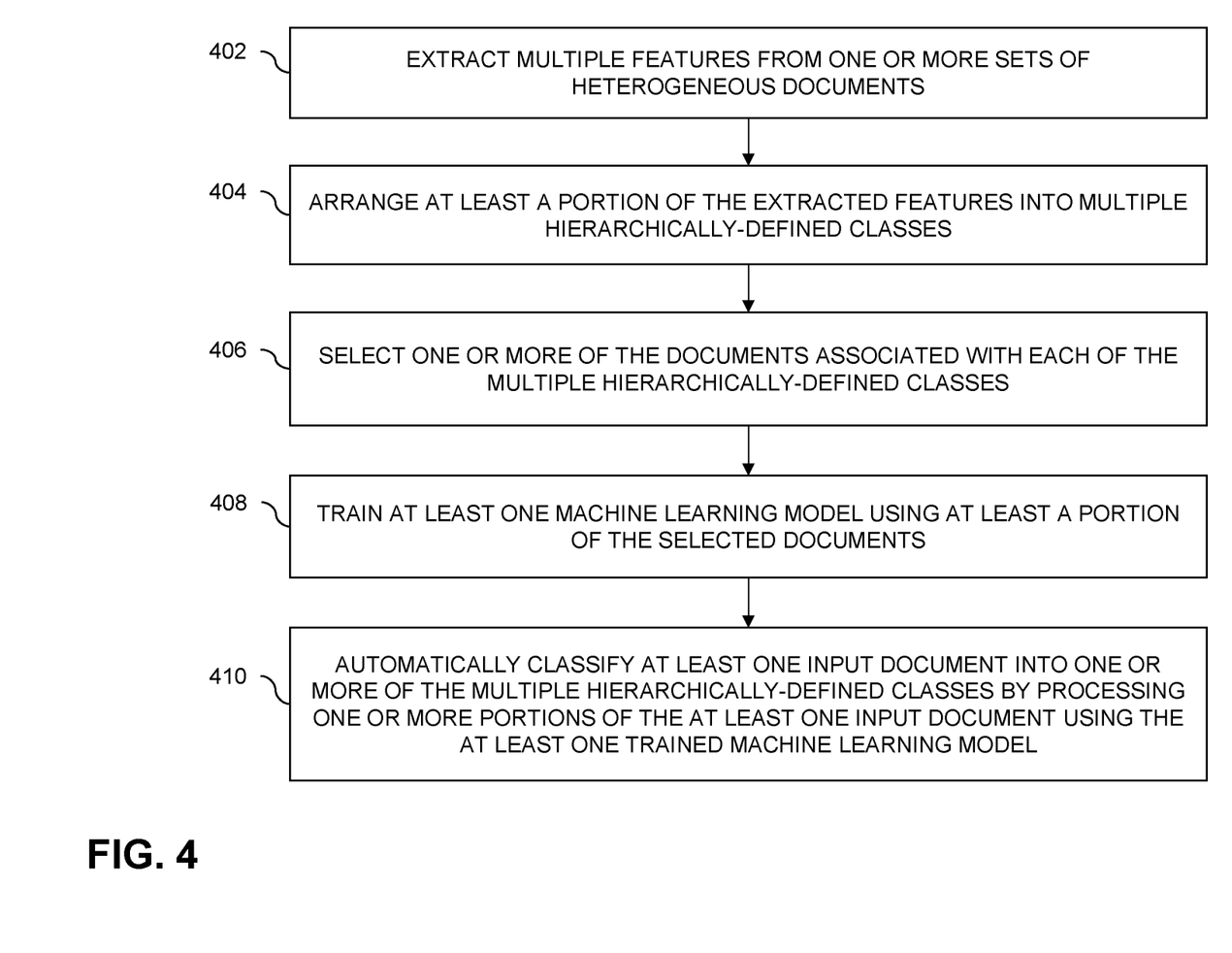
FIG. 4 is a flow diagram illustrating techniques according to an embodiment of the invention.

FIG. 4 is a flow diagram illustrating techniques according to an embodiment of the present invention. Step 402 includes extracting multiple features from one or more sets of heterogeneous documents. In one or more embodiments, extracting multiple features from one or more sets of heterogeneous documents includes creating at least one bag of features for use in differentiating between documents across the one or more sets.

Step 404 includes arranging at least a portion of the extracted features into multiple hierarchically-defined classes. In at least one embodiment, arranging at least a portion of the extracted features into multiple hierarchically-defined classes includes automatically determining a granularity of classification required based at least in part on the extracted features and the number of sets contained within the one or more sets of heterogeneous documents. Additionally or alternatively, one or more embodiments can include adjusting one or more of the multiple hierarchically-defined classes based at least in part on feedback from one or more users.

Step 406 includes selecting one or more of the documents associated with each of the multiple hierarchically-defined classes. Step 408 includes training at least one machine learning model using at least a portion of the selected documents. In at least one embodiment, the at least one machine learning model includes at least one machine learning-based object detection model and/or at least one machine learning-based random forest model.

Step 410 includes automatically classifying at least one input document into one or more of the multiple hierarchically-defined classes by processing one or more portions of the at least one input document using the at least one trained machine learning model. In one or more embodiments, automatically classifying the at least one input document includes extracting one or more features from the at least one document and mapping, using the at least one trained machine learning model, at least a portion of the one or more extracted features to one or more of the multiple hierarchically-defined classes. Additionally or alternatively, automatically classifying the at least one input document can include automatically selecting one of the at least one trained machine learning model for classifying the at least one input document.

The techniques depicted in FIG. 4 can also include further training the at least one machine learning model based at least in part on one or more results of automatically classifying the at least one input document. Additionally, one or more embodiments can include recommending one or more processing actions to render the at least one input document suitable classification into one or more of the multiple hierarchically-defined classes.

Also, in at least one embodiment, software implementing the techniques depicted in FIG. 4 can be provided as a service in a cloud environment.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
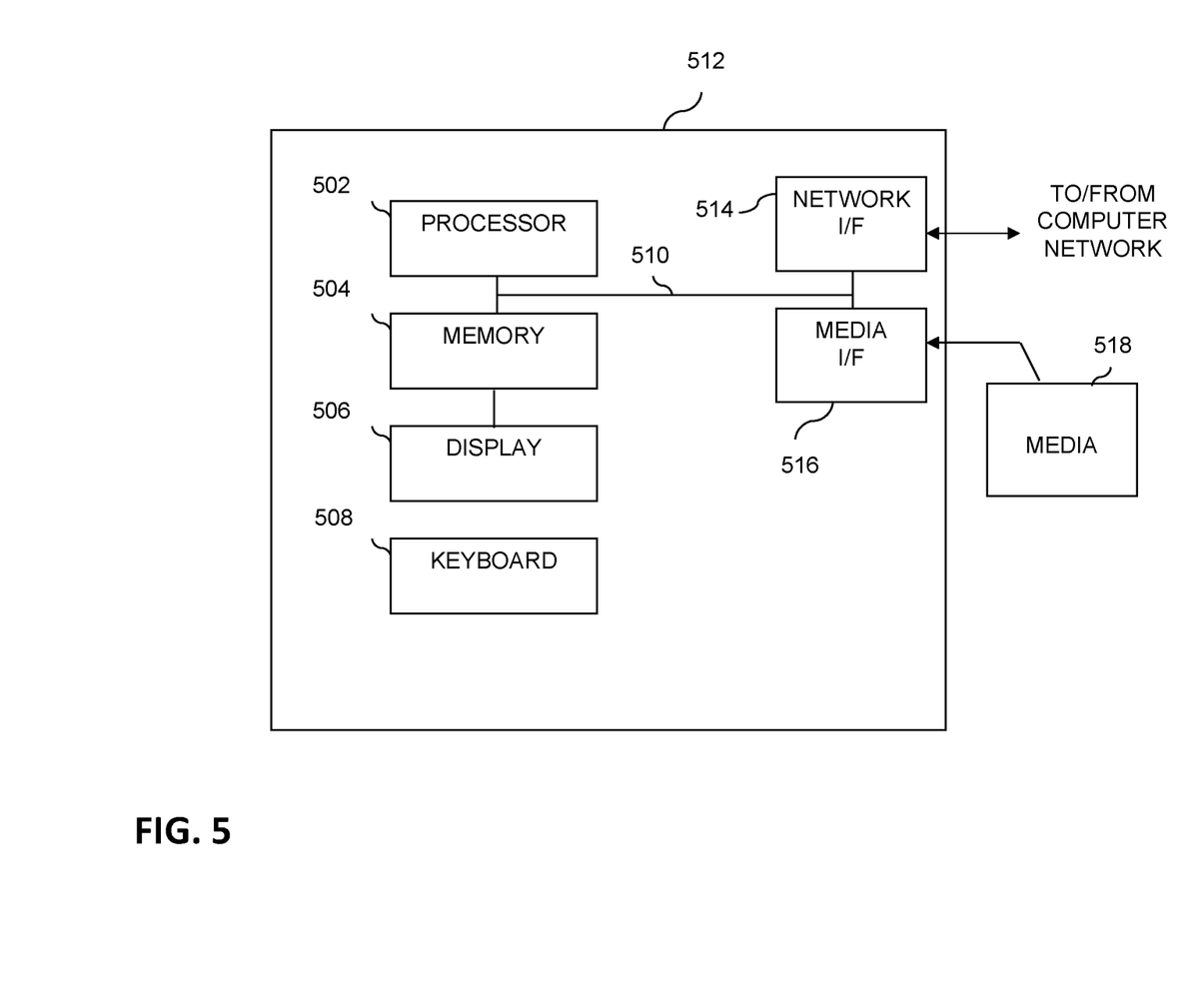
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
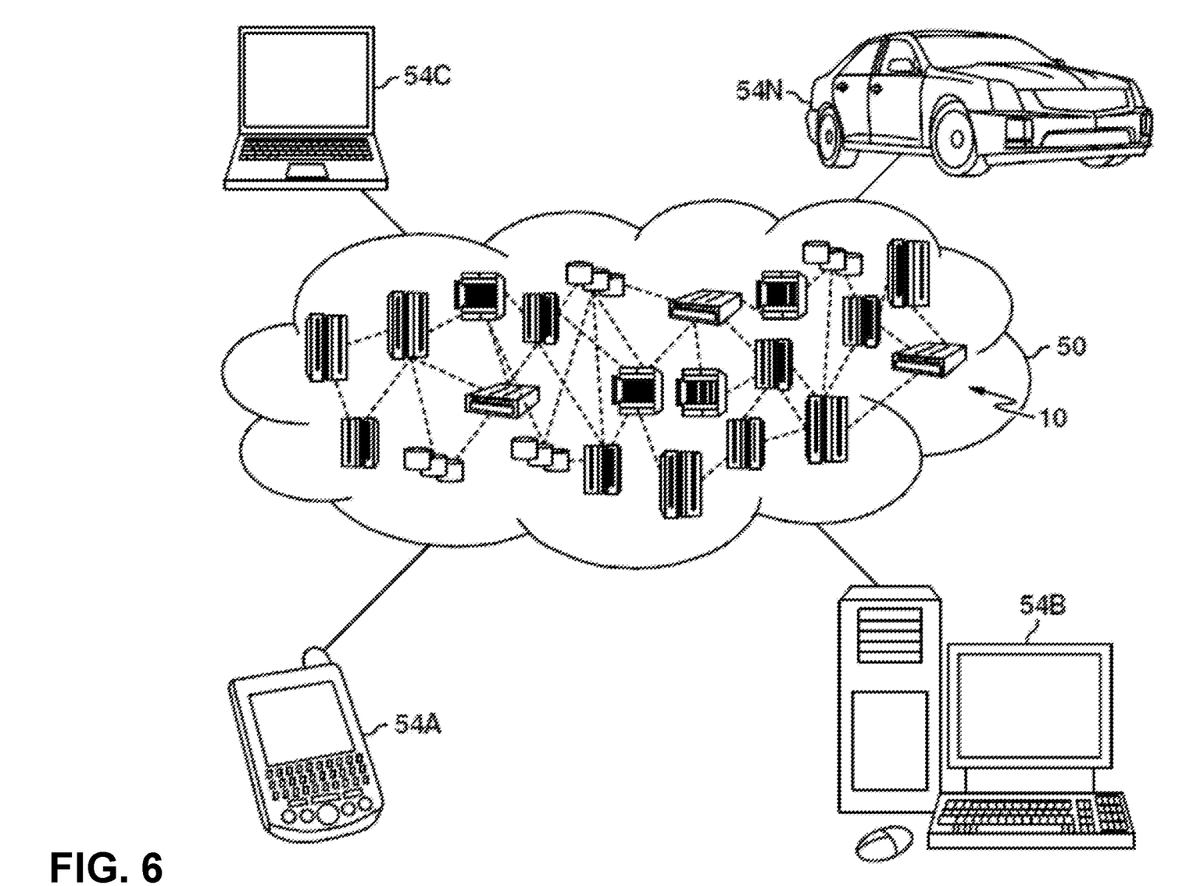
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
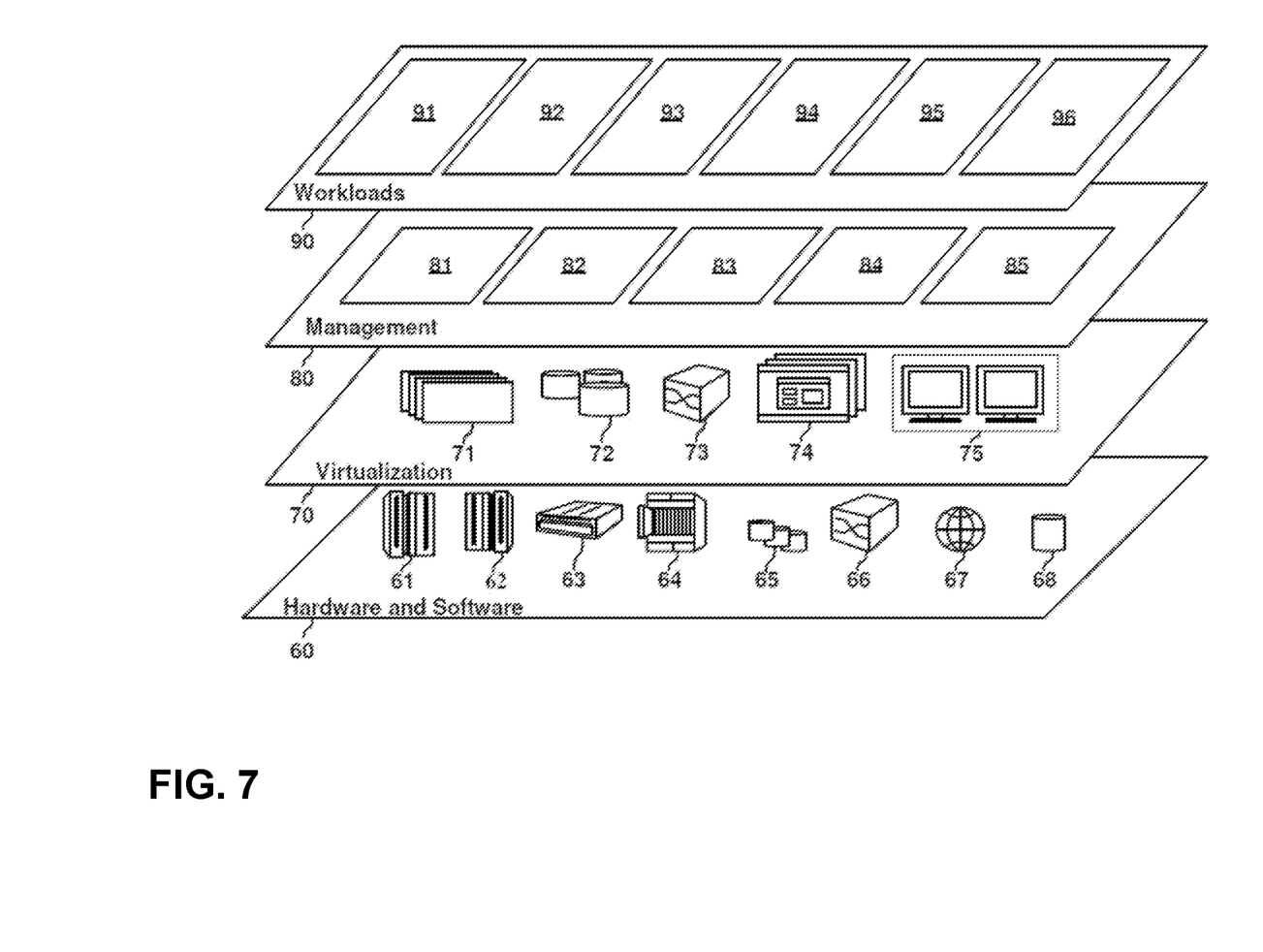
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document classification 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically classifying heterogeneous domain-specific documents using machine learning techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   extracting multiple features from heterogeneous documents, wherein extracting the multiple features comprises extracting, from the heterogeneous documents, size of at least one formatting object within the heterogeneous documents, position of at least one formatting object in the heterogeneous documents, distance of at least one given formatting object from neighboring formatting objects in the heterogeneous documents, and at least one ratio of font sizes across each of document titles, document headers, document footers, and document body text;

arranging the extracted features into multiple hierarchically-defined classes;
selecting documents, from the heterogeneous documents, associated with the multiple hierarchically-defined classes;
training at least one machine learning model using the selected documents;
automatically classifying at least one input document in accordance with the multiple hierarchically-defined classes by processing portions of the at least one input document using the at least one trained machine learning model;
automatically outputting, to a device associated with the at least one input document, results of the classifying of the at least one input document; and
automatically further training the at least one machine learning model based at least in part on the results of the classifying of the at least one input document;
wherein the method is carried out by at least one computing device.

2. The computer-implemented method of claim 1, wherein arranging the extracted features into multiple hierarchically-defined classes comprises automatically determining a granularity of classification required based at least in part on the extracted features and the number of sets contained within the heterogeneous documents.

3. The computer-implemented method of claim 1, wherein the at least one machine learning model comprises at least one machine learning-based object detection model.

4. The computer-implemented method of claim 1, wherein the at least one machine learning model comprises at least one machine learning-based random forest model.

5. The computer-implemented method of claim 1, wherein automatically classifying the at least one input document comprises:
extracting features from the at least one document; and
mapping, using the at least one trained machine learning model, the extracted features to the multiple hierarchically-defined classes.

6. The computer-implemented method of claim 1, wherein automatically classifying the at least one input document comprises automatically selecting one of the at least one trained machine learning model for classifying the at least one input document.

7. The computer-implemented method of claim 1, further comprising:
adjusting the multiple hierarchically-defined classes based at least in part on feedback from users.

8. The computer-implemented method of claim 1, wherein extracting multiple features from heterogeneous documents comprises creating at least one bag of features for use in differentiating between documents across the heterogeneous documents.

9. The computer-implemented method of claim 1, further comprising:
recommending a processing action to render the at least one input document suitable for classification into one of the multiple hierarchically-defined classes.

10. The computer-implemented method of claim 1, wherein software implementing the method is provided as a service in a cloud environment.

11. A computer program product comprising a non-transitory computer readable storage medium having program instructions embodied therewith, the program instructions executable by a computing device to cause the computing device to:
extract multiple features from heterogeneous documents, wherein extracting the multiple features comprises extracting, from the heterogeneous documents, size of at least one formatting object within the heterogeneous documents, position of at least one formatting object in the heterogeneous documents, distance of at least one given formatting object from neighboring formatting objects in the heterogeneous documents, and at least one ratio of font sizes across each of document titles, document headers, document footers, and document body text;
arrange the extracted features into multiple hierarchically-defined classes;
select documents, from the heterogeneous documents, associated with the multiple hierarchically-defined classes;
train at least one machine learning model using the selected documents;
automatically classify at least one input document in accordance with the multiple hierarchically-defined classes by processing portions of the at least one input document using the at least one trained machine learning model;
automatically output, to a device associated with the at least one input document, results of the classifying of the at least one input document; and
automatically further train the at least one machine learning model based at least in part on the results of the classifying of the at least one input document.

12. The computer program product of claim 11, wherein arranging the extracted features into multiple hierarchically-defined classes comprises automatically determining a granularity of classification required based at least in part on the extracted features and the number of sets contained within the heterogeneous documents.

13. The computer program product of claim 11, wherein the at least one machine learning model comprises at least one machine learning-based object detection model.

14. The computer program product of claim 11, wherein the at least one machine learning model comprises at least one machine learning-based random forest model.

15. The computer program product of claim 11, wherein automatically classifying the at least one input document comprises:
extracting features from the at least one document; and
mapping, using the at least one trained machine learning model, the extracted features to the multiple hierarchically-defined classes.

16. The computer program product of claim 11, wherein automatically classifying the at least one input document comprises automatically selecting one of the at least one trained machine learning model for classifying the at least one input document.

17. The computer program product of claim 11, wherein extracting multiple features from heterogeneous documents comprises creating at least one bag of features for use in differentiating between documents across the heterogeneous documents.

18. A system comprising:
a memory configured to store program instructions; and
a processor operatively coupled to the memory to execute the program instructions to:
extract multiple features from heterogeneous documents, wherein extracting the multiple features comprises extracting, from the heterogeneous documents, size of at least one formatting object within the heterogeneous documents, position of at least one formatting object in the heterogeneous documents, distance of at least one given formatting object from neighboring formatting objects in the heterogeneous documents, and at least one ratio of sizes across each of document titles, document headers, document footers, and document body text;

arrange the extracted features into multiple hierarchically-defined classes;

select documents, from the heterogeneous documents, associated with the multiple hierarchically-defined classes;

train at least one machine learning model using the selected documents;

automatically classify at least one input document in accordance with the multiple hierarchically-defined classes by processing portions of the at least one input document using the at least one trained machine learning model;

automatically output, to a device associated with the at least one input document, results of the classifying of the at least one input document; and automatically further train the at least one machine learning model based at least in part on the results of the classifying of the at least one input document.

19. The system of claim 18, wherein arranging the extracted features into multiple hierarchically-defined classes comprises automatically determining a granularity of classification required based at least in part on the extracted features and the number of sets contained within the heterogeneous documents.

20. The system of claim 18, wherein extracting multiple features from heterogeneous documents comprises creating at least one bag of features for use in differentiating between documents across the heterogeneous documents.

* * * * *